United States Patent
Zhang et al.

(10) Patent No.: US 9,736,064 B2
(45) Date of Patent: Aug. 15, 2017

(54) OFFLINE QUERIES IN SOFTWARE DEFINED NETWORKS

(71) Applicant: NEC Laboratories America, Inc., Princeton, NJ (US)

(72) Inventors: Hui Zhang, Princeton Junction, NJ (US); Behnaz Arzani, Philadelphia, PA (US); Franjo Ivancic, Princeton, NJ (US); Junghwan Rhee, Princeton, NJ (US); Nipun Arora, Plainsboro, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 14/571,778

(22) Filed: Dec. 16, 2014

(65) Prior Publication Data
US 2015/0172185 A1 Jun. 18, 2015

Related U.S. Application Data

(60) Provisional application No. 61/917,072, filed on Dec. 17, 2013.

(51) Int. Cl.
*H04L 12/717* (2013.01)
*H04L 12/701* (2013.01)
*H04L 12/841* (2013.01)

(52) U.S. Cl.
CPC .......... *H04L 45/42* (2013.01); *H04L 45/00* (2013.01); *H04L 47/283* (2013.01)

(58) Field of Classification Search
None
See application file for complete search history.

(56) References Cited

U.S. PATENT DOCUMENTS

| | | | | |
|---|---|---|---|---|
| 2005/0213514 A1* | 9/2005 | Su | | H04L 41/142 370/254 |
| 2008/0320154 A1* | 12/2008 | Demmer | | H04W 4/02 709/229 |
| 2012/0051229 A1* | 3/2012 | Feldmann | | H04L 43/12 370/242 |
| 2014/0379885 A1* | 12/2014 | Krishnamurthy | | H04L 45/56 709/223 |
| 2015/0363522 A1* | 12/2015 | Maurya | | H04L 43/50 703/13 |

OTHER PUBLICATIONS

Wundsam, A., et al. "OFRewind: Enabling Record and Replay Troubleshooting for Networks," Jun. 2011.pp. 1-14.

* cited by examiner

*Primary Examiner* — Yemane Mesfin
*Assistant Examiner* — Peter Chen
(74) *Attorney, Agent, or Firm* — Joseph Kolodka

(57) ABSTRACT

Methods and systems for finding a packet's routing path in a network includes intercepting control messages sent by a controller to one or more switches in a software defined network (SDN). A state of the SDN at a requested time is emulated and one or more possible routing paths through the emulated SDN is identified by replaying the intercepted control messages to one or more emulated switches in the emulated SDN. The one or more possible routing paths correspond to a requested packet injected into the SDN at the requested time.

4 Claims, 3 Drawing Sheets

OFFLINE QUERIES IN SOFTWARE DEFINED NETWORKS

RELATED APPLICATION INFORMATION

This application claims priority to provisional application No. 61/917,072, filed Dec. 17, 2013, and the contents thereof are incorporated herein by reference.

BACKGROUND OF THE INVENTION

Software defined networks (SDNs) feature an emerging class of network architectures called forwarding architectures. These architectures split control plane decision-making off from data plane forwarding. In doing so, they enable custom programmability and centralization of the control plane while allowing for commodity high-throughput, high-fanout data plane forwarding elements.

However, debugging operational SDNs can be a daunting task due to their size, distributed state, and high complexity in the controller software. The debugging tool set available to network operators is limited. Existing debugging solutions use online packet or flowtable dumping in SDN switches to determine the precise routing paths that data packets took in the network, each of which has its own drawbacks.

BRIEF SUMMARY OF THE INVENTION

A method for finding a packet's routing path in a network includes intercepting control messages sent by a controller to one or more switches in a software defined network (SDN). A state of the SDN at a requested time is emulated and one or more possible routing paths through the emulated SDN is identified by replaying the intercepted control messages to one or more emulated switches in the emulated SDN. The one or more possible routing paths correspond to a requested packet injected into the SDN at the requested time.

A system for finding a packet's path in a network includes a proxy configured to intercept control messages sent by a controller to one or more switches in an SDN. A network emulator comprising a processor is configured to emulate a state of the SDN at a requested time and to identify one or more possible routing paths through the emulated SDN by replaying the intercepted control messages to one or more emulated switches in the emulated SDN. The one or more routing possible paths correspond to a requested packet inserted into the SDN at the requested time.

DETAILED DESCRIPTION

Embodiments of the present invention support offline queries on the precise routing paths that data packets take in a forwarding architecture network without instrumentation or tracing in software defined networking (SDN) switches. This includes recording the control messages exchanged between an SDN controller and switches, along with measurements of the network latency between the SDN controller and switches.

Figure 1:
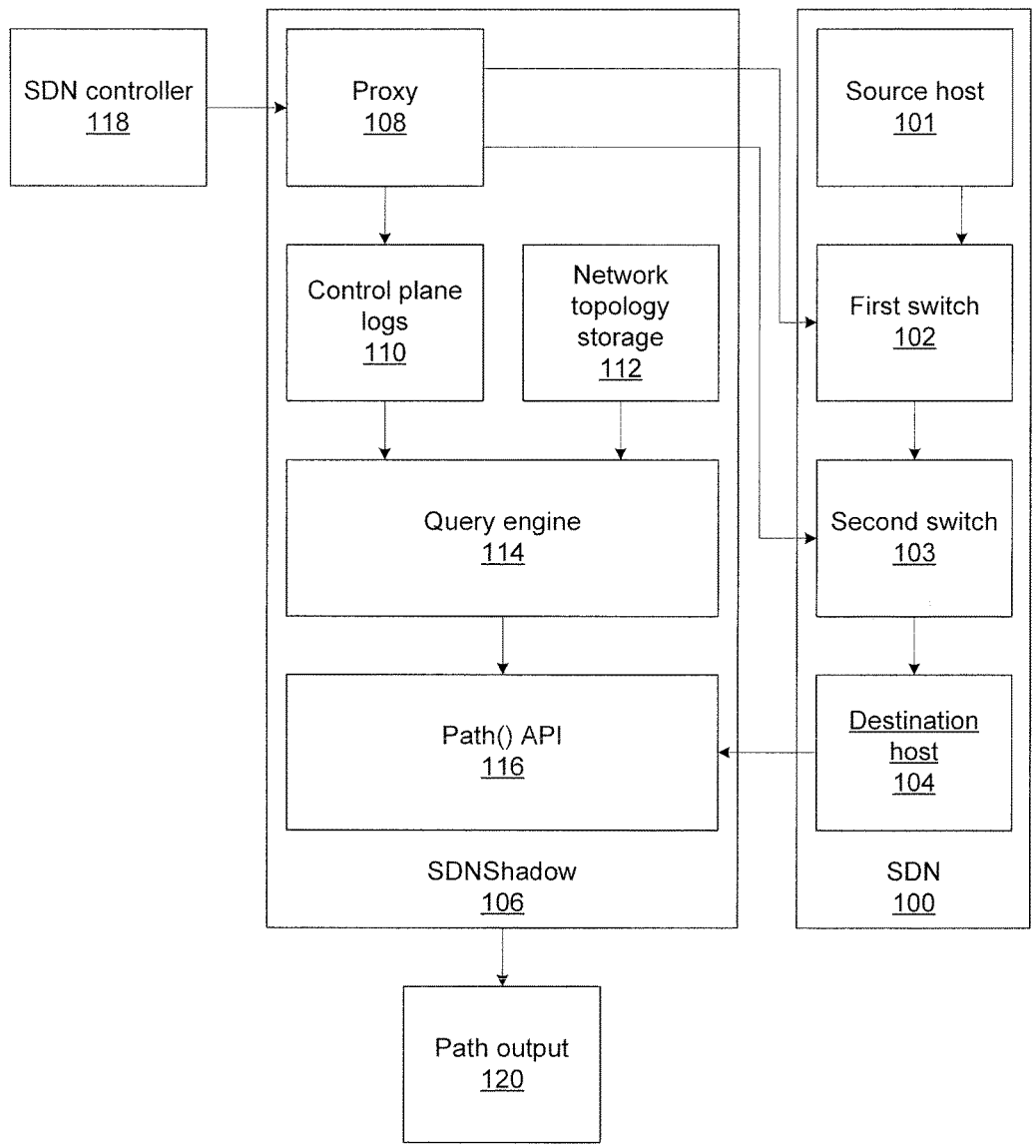
FIG. 1 is a block/flow diagram illustrating a software defined networking (SDN) shadow system in accordance with the present principles.

Referring now to FIG. 1, an exemplary forwarding architecture network is shown. A software defined network 100 includes a source host 101 which communicates with a destination host 104 via, in this case, a first switch 102 and a second switch 103. It should be understood that the precise path of packets from the source host 101 to the destination host 104 can change as the logical network structure is reconfigured by switches 102 and 103.

Control messages between the switches 102 and 103 and a controller 118, which change flow tables in the switches 102 and 103, are recorded, along with measurements of the network latency between the controller 118 and the switches 102 and 103. To accomplish this, an SDN Shadow block 106 is interposed between the controller 118 and the SDN 100. The primary purpose of the control messages is to add, delete, and modify flow/group entries in the flow tables and to set switch port properties. A proxy 108 intercepts control messages from SDN controller 118 and stores them in control plane logs 110. The control messages can be obtained by using existing tools, such as packet sniffers, or by specialized plugins in the controller software, to create a local copy. The proxy 108 also records the time that each control message is sent, the network latency in round trip time between the controller 118 and the switches 102 and 103. At the beginning of recording, the proxy 108 also logs a snapshot of the flow tables in the switches if they are not empty and logs the SDN network topology information, including switch information, network links between switches, and last-hop links between switches and interested hosts.

To find path information, control message traces are played back in a network emulator upon a precise routing path query for a data packet at a certain time in the recording period in the query engine 114, using information from network topology storage 112. The query engine 114 offers a user interface to take a data packet and time stamp as inputs and runs a the network emulator to replay the selected set of recorded control messages to determine the path the data packet could take if it were injected into the SDN 100 at the time specified. Possible flow table states at the switches in question are reconstructed and the possible routing paths that the data packet in question could take are found at path API 116. Optionally the possibilities assigned to those routing paths are calculated. This information is output in block 120 and may be in the form of an ordered list that encodes the switches traversed, the switch input and output ports, and a matched flow entry.

Accepting the query input in the query engine 114 includes receiving a packet event, defined by the packet, the time, and an input switch. The packet may be in the format of a network packet that includes an Ethernet frame and IP header. Time T specifies the time when the packet entered the SDN network 100. The input switch information is optional and may specify the first switch and port where the packet arrived in the network 100. Contrary to existing path-oriented request tracing solutions, the query engine 114 allows users to input a packet event in the format <packet X, time T, [switch $S_0$:portIN]> and receive a reply on the precise path information that the network packet could take in the network 100.

Rebuilding the switch flow tables selects a subset of the recorded control messages and creates an emulation of the original SDN network with the recorded network topology information, re-injects the selected set of control messages through an emulated controller to the emulated switches, and then dumps the related flow table entry information from all the emulated switches.

The emulation information is then searched to find which switches and routing rules the packet could pass through, constructing precise routing paths. The path API 116 outputs paths with the format of an ordered list as described above to generate the output 120.

Figure 2:
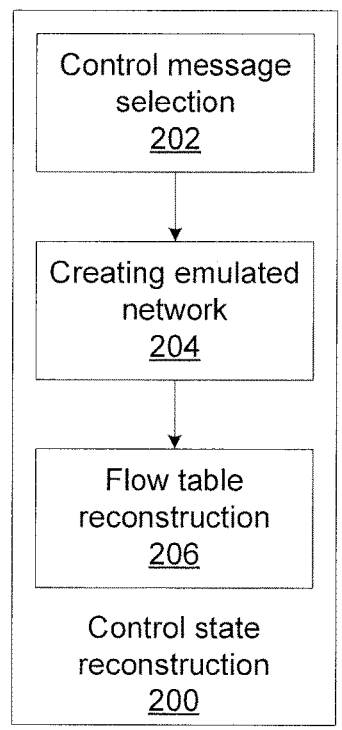
FIG. 2 is a block/flow diagram illustrating the reconstruction of switch control states in an SDN in accordance with the present principles.

Referring now to FIG. 2, detail on the reconstruction of the control state 200 is shown. Block 202 selects recorded control messages given an input packet and a queried arrival time. Block 202 finds the set of recorded control messages that could possibly affect routing decisions for the packet. If the user provides the first hop switch information, the starting switch set is initialized accordingly. Otherwise, the starting switch set is initialized as including all available switches and their ports. For each first-hop switch, a mean return trip time (RTT) between the controller 118 and the switch is computed with a respective variance is determined. This is based on network latency information recorded by the proxy 108.

A starting time $T_s$ is determined, defined as the time before which switch states will not influence routing decisions for the packet. If, for every control message that is sent to a switch matching the packet and incoming port on the packet fields, the control message has a recorded time stamp $T_i$ that satisfies:

$$T_i + \frac{E_{RTT}}{2} + k\sigma_{RTT} < T_0 \text{ OR } T_i + \frac{E_{RTT}}{2} - k\sigma_{RTT} > T_0$$

where $T_s = T_0$, where $E_{RTT}$ is the mean RTT, $\sigma_{RTT}$ is the variance on the RTT, $T_0$ is the input timestamp, and k is the Z-value in the statistical confidence interval. If not, then $$T_s = T_x + \frac{E_{RTT}}{2} - k\sigma_{RTT},$$

where $T_x$ is the time stamp of the earliest control message matching the packet and violating the above condition.

All recorded control messages sent to the respective initial switch are selected which have time stamps no later than $T_s$ and contain flow table entries matching the packet and incoming port on the packet fields. These control messages are put in a time-ordered list. If there are no such messages, then the switch in question is removed from consideration as an initial switch. If there are no switches having such control messages, then the user is informed that no valid path was found.

Creating the emulated network in block 204 uses the recorded network topology information 112 to form an emulated network having the same topology as the traced SDN network 100.

Reconstructing the flow table in block 206 uses the packet, the input timestamp $T_s$, and the results of blocks 202 and 204 to reconstruct switch flow table entries that affect the packet's routing decisions. Reconstruction begins with initializing all of the flow tables of all emulated switches with logged snapshots. An emulated controller sends recorded control messages to each emulated switch in time order until the first message is found that goes through without generating an error message and that has a time stamp $T_{c0}$ such that $$T_{c0} + \frac{E_{RTT}}{2} - k\sigma_{RTT} \cap [T_s, T_s + T_D] \neq \emptyset \text{ and}$$

$$T_{c0} + \frac{E_{RTT}}{2} + k\sigma_{RTT} \cap [T_s, T_s + T_D] \neq \emptyset,$$

where $T_D$ is the maximum time a packet can remain in the network and is a function of network diameter. This message and any remaining control messages satisfying the same conditions are copied into a time ordered list called Potential $(S_0)$ that includes all of the control messages that potentially affect the routing decision on the packet at the switch $S_0$.

Three hash tables are initialized: RoutingTree($S_0$), stored-States($S_0$), and storedHops($S_0$). The packet is applied to the current flow table of the emulated switch $S_0$ and the first flow table entry E having an output action and matching the packet and incoming port is found. If no entry is found, then there is no forwarding action for the packet at this point. If the list Potential($S_0$) is not empty, the next control message is selected and applied to the current flow table. This is repeated until either Potential($S_0$) is empty or a matching entry is found.

The entry's output action specifies the next port. If RoutingTree($S_0$) already includes an entry corresponding to the same switch and next port, then the next control message is selected and applied to the current flow table to search for new next ports. Otherwise, a new hash table entry is created and inserted into RoutingTree($S_0$).

The stored network topology information is used to find the other end of the network link connected to the next port. If there is no such link information, then the next control message is selected and applied to the current flow table. Otherwise processing continues from the connected switch (called the current switch in the following) and port.

All control messages sent to the current switch, having a timestamp no later than $T_s$ and having control flow table entries that match the packet and incoming port on the packet fields, are put into a time ordered list activeMSG. If the list is empty, the hash table for the entry is updated to indicate in the tree that a dead end has been reached. If there are entries in the list, the emulated controller sends the control messages in the list to the emulated current switch in the same time order until the first message is found that satisfies the same timestamp condition set forth above.

The qualifying messages are copied into a time ordered list Potential(currentSwitch), as these messages potentially affect the routing decision on the packet. They are used to record all possible next-hop routing decisions for the packet in the current switch. The packet is applied to the current flow table of the emulated switch currentSwitch and the first flow table entry F having an output action and matching the packet and incoming port is found. If there is no such entry, and if Potential(currentSwitch) is not empty, the first control message in the list is selected and applied to the emulated switch currentSwitch. The message is removed from Potential(currentSwitch).

The output action of F specifies the next port. The hash table is updated with an entry identifying the next port. If there is already an entry in storedHops($S_0$) for currentSwitch on the current input point then a routing loop is detected and the message is removed from Potential($S_0$). Otherwise, a new key is inserted into storedHops($S_0$).

If Potential(currentSwitch) is empty or uninitialized, the state is rolled back to the previous switch and the entry for the hop is deleted from storedStates($S_0$) and storedHops($S_0$). The entire set of potential messages is recursively evaluated in this way to build a set of one or more possible paths that the packet could have taken through the network 100. Once RoutingTree($S_0$) is complete, it can be searched for feasible routing paths to generate the output 120.

The routing paths may be searched by repeating, for each key in RoutingTree($S_0$), a depth-first search. Whenever a leaf node is reached, the complete path from the root node to the leaf node is recorded with the concatenated per-node value information in the format of an ordered list. These lists may then be returned to the users to represent the recorded precise routing paths.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
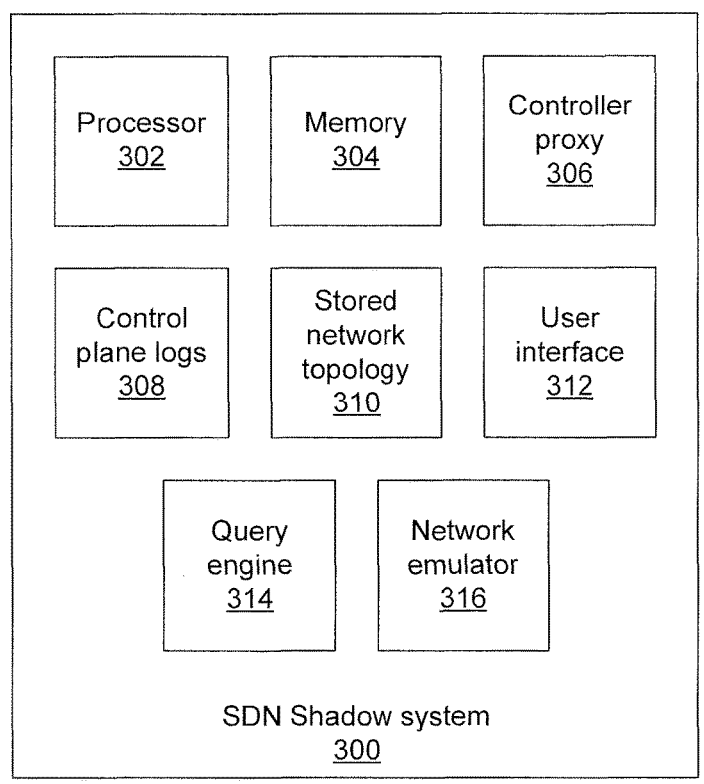
FIG. 3 is a block diagram of an SDN shadow system in accordance with the present principles.

Referring now to FIG. 3, an SDN shadow system 300 is shown. A processor 302 interfaces with a memory 304 to identify and output the paths that a given packet may take through an SDN 100. A controller proxy module 306 receives information from the SDN controller 118 and stores control messages in the memory 304 as control plane logs 308. In addition, the proxy 306 stores network topology information 310 and any available network status information such as mean RTT time and RTT variance.

A user interface 312 interfaces with query engine 314 to provide a user with the ability to enter a query for a specific packet at a given timestamp. The packet information includes packet headers. The query may furthermore optionally include information relating to the initial switch at which the packet entered the network 100. The query engine 114 provides the user's query to a network emulator 316 which uses a processor 302 to emulate the network 100 based on the control plane logs 308 and the stored network topology, creating a set of possible paths that the packet could have taken through the network. These possible paths are then displayed to the user through the user interface 312.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for finding a packet's routing path in a network, comprising:

intercepting control messages sent by a controller to one or more switches in a software defined network (SDN);

emulating a state of the SDN at a requested time; and identifying one or more possible routing paths through the emulated SDN by replaying the intercepted control messages to one or more emulated switches in the emulated SDN, wherein said one or more possible routing paths correspond to a requested packet injected into the SDN at the requested time; and determining a starting time $T_s$, defined as the time before which switch states will not influence routing decisions for the packet, as $T_s=T_0$ if, for every control message that is sent to a switch matching the packet and incoming port on the packet fields, the control message has a recorded time stamp $T_i$ that satisfies:

$$T_i + \frac{E_{RTT}}{2} + k\sigma_{RTT} < T_0 \text{ OR } T_i + \frac{E_{RTT}}{2} - k\sigma_{RTT} > T_0$$

where $E_{RTT}$ is the mean RTT, $\sigma_{RTT}$ is the variance on the RTT, $T_0$ is the input timestamp, and k is the Z-value in the statistical confidence interval, and $$T_s = T_x + \frac{E_{RTT}}{2} - k\sigma_{RTT}$$

otherwise, where $T_x$ is the time stamp of the earliest control message matching the packet and violating the above condition; and wherein identifying one or more possible routing paths comprises reconstructing flow table states of the one or more emulated switches based on the intercepted control messages and round trip time (RTT) information.

2. A method for finding a packet's routing path in a network, comprising:

intercepting control messages sent by a controller to one or more switches in a software defined network (SDN);

emulating a state of the SDN at a requested time; and identifying one or more possible routing paths through the emulated SDN by replaying the intercepted control messages to one or more emulated switches in the emulated SDN, wherein said one or more possible routing paths correspond to a requested packet injected into the SDN at the requested time; and wherein identifying one or more possible routing paths comprises reconstructing flow table states of the one or more emulated switches based on the intercepted control messages and round trip time (RTT) information; and wherein intercepted control messages selected for reconstructing the flow table states are all messages earlier than $T_x$ until the first message whose time stamp $T_{c0}$ satisfies $$T_{c0} + \frac{E_{RTT}}{2} - k\sigma_{RTT} \cap [T_s, T_s + T_D] \neq \emptyset \text{ and}$$

$$T_{c0} + \frac{E_{RTT}}{2} + k\sigma_{RTT} \cap [T_s, T_s + T_D] \neq \emptyset,$$

where $T_D$ is the maximum time a packet can remain in the network and is a function of network diameter, wherein a first selected message and any remaining control messages satisfying the same conditions are copied into a time ordered list that includes all of the control messages that potentially affect the routing decision on the packet at the switch.

3. A system for finding a packet's path in a network, comprising:
   a proxy comprising a processor and a memory storing an executable program code executed by the processor configured to intercept control messages sent by a controller to one or more switches in a software defined network (SDN); and
   a network emulator comprising a processor and a memory storing an executable program code executed by the processor configured to emulate a state of the SDN at a requested time and to identify one or more possible routing paths through the emulated SDN by replaying the intercepted control messages to one or more emulated switches in the emulated SDN, wherein said one or more routing possible paths correspond to a requested packet inserted into the SDN at the requested time wherein the network emulator is configured to reconstruct flow table states of the one or more emulated switches based on the intercepted control messages and round trip time (RTT) information; and wherein the network emulator is further configured to determine a starting time $T_s$, defined as the time before which switch states will not influence routing decisions for the packet, as $T_s = T_0$ if, for every control message that is sent to a switch matching the packet and incoming port on the packet fields, the control message has a recorded time stamp $T_i$ that satisfies:

$$T_i + \frac{E_{RTT}}{2} + k\sigma_{RTT} < T_0 \text{ OR } T_i + \frac{E_{RTT}}{2} - k\sigma_{RTT} > T_0$$

where $E_{RTT}$ is the mean RTT, $\sigma_{RTT}$ is the variance on the RTT, $T_0$ is the input timestamp, and k is the Z-value in the statistical confidence interval, and $$T_s = T_x + \frac{E_{RTT}}{2} - k\sigma_{RTT}$$

otherwise, where $T_x$ is the time stamp of the earliest control message matching the packet and violating the above condition.

4. A system for finding a packet's path in a network, comprising:
   a proxy comprising a processor and a memory storing an executable program code executed by the processor configured to intercept control messages sent by a controller to one or more switches in a software defined network (SDN); and
   a network emulator comprising a processor and a memory storing an executable program code executed by the processor configured to emulate a state of the SDN at a requested time and to identify one or more possible routing paths through the emulated SDN by replaying the intercepted control messages to one or more emulated switches in the emulated SDN, wherein said one or more routing possible paths correspond to a requested packet inserted into the SDN at the requested time wherein the network emulator is configured to reconstruct flow table states of the one or more emulated switches based on the intercepted control messages and round trip time (RTT) information; and wherein intercepted control messages selected for reconstructing the flow table states are all messages earlier than $T_x$ until the first message whose time stamp $T_{c0}$ satisfies $$T_{c0} + \frac{E_{RTT}}{2} - k\sigma_{RTT} \cap [T_s, T_s + T_D] \neq \emptyset \text{ and}$$

$$T_{c0} + \frac{E_{RTT}}{2} + k\sigma_{RTT} \cap [T_s, T_s + T_D] \neq \emptyset,$$

is the maximum time a packet can remain in the network and is a function of network diameter, wherein a first selected message and any remaining control messages satisfying the same conditions are copied into a time ordered list that includes all of the control messages that potentially affect the routing decision on the packet at the switch.

* * * * *